United States Patent [19]

Mizuno et al.

[11] Patent Number: 4,478,908

[45] Date of Patent: Oct. 23, 1984

[54] MAGNETIC RECORDING MEDIUM

[75] Inventors: Chiaki Mizuno; Yasuo Tamai, both of Kanagawa, Japan

[73] Assignee: Fuji Photo Film Company Limited, Kanagawa, Japan

[21] Appl. No.: 437,048

[22] Filed: Oct. 27, 1982

[30] Foreign Application Priority Data

Oct. 27, 1981 [JP] Japan .................................. 56-171894

[51] Int. Cl.³ .......................... B32B 5/16; G11B 5/78
[52] U.S. Cl. .................................... 428/327; 360/134; 428/692; 428/694; 428/900; 428/922; 428/480; 428/323; 352/235
[58] Field of Search ............... 428/900, 922, 327, 323, 428/694, 692, 480; 360/134–136; 352/235

[56] References Cited

U.S. PATENT DOCUMENTS

| 4,038,453 | 7/1977 | Loran | 428/325 |
| 4,091,168 | 5/1978 | Kawamata | 428/900 |
| 4,189,514 | 2/1980 | Johnson | 428/922 |
| 4,202,927 | 5/1980 | Yamaguchi | 428/323 |
| 4,213,870 | 7/1980 | Loran | 428/900 |
| 4,275,108 | 6/1981 | Yamaguchi | 428/323 |
| 4,397,911 | 8/1983 | Akashi | 428/323 |

Primary Examiner—Ellis P. Robinson
Attorney, Agent, or Firm—Sughrue, Mion, Zinn, Macpeak, and Seas

[57] ABSTRACT

A magnetic recording medium comprising a support having coated thereon a magnetic layer and a leader tape connected to at least one end of the support and the magnetic layer, the leader tape comprising a support having coated thereon a cleaning layer containing an organic high molecular weight powder and a binder, and an antistatic layer being provided on at least one surface of the leader tape.

8 Claims, 1 Drawing Figure

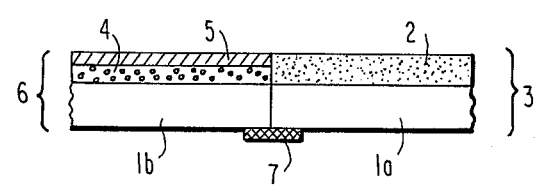

MAGNETIC RECORDING MEDIUM

FIELD OF THE INVENTION

This invention relates to a magnetic recording medium having a leader tape, more particularly to an antistatic treatment for a leader tape having high light transmission comprising a support having coated thereon a cleaning layer containing an organic high molecular weight powder and a binder.

BACKGROUND OF THE INVENTION

A cleaning tape comprising a support having coated thereon a mixture of an organic high molecular weight powder and a binder has a coarse surface and high light transmission and is effective with systems which detect the end of a magnetic recording tape photoelectrically. However, a leader tape (or a trailer tape) is easily charged through rubbing and stripping and problems caused by charging also take place during manufacturing the same, for example, during slitting the leader tape. Further, slit tapes tend to tangle with each other because of charging which makes handling such tapes difficult. Also, while a tape is running it attracts dust because of charging, which damages both the tape and recording, playback, etc. heads (often merely heads herein).

SUMMARY OF THE INVENTION

A first object of this invention is to provide a leader tape which has been subjected to an antistatic treatment and has high light transmission and a magnetic recording medium attached thereto.

A second object of this invention is to provide a leader tape which has been subjected to an antistatic treatment and which is easy to manufacture and a magnetic recording medium attached thereto.

A third object of this invention is to provide a leader tape which does not cause harm to a magnetic recording medium and heads and which has a magnetic recording medium attached thereto.

A fourth object of this invention is to provide a leader tape having improved running properties with a magnetic recording medium attached thereto.

We have found, as a result of our research and observations, that an antistatic agent coated on at least one of surface of a cleaning tape containing a high molecular weight powder and a binder provided on a support reaches the above objects.

Antistatic agents include surface active agents and electroconductive substances such as iron, silver, copper, carbon powders, but in the present invention surface active agents which provide hydrophilic groups on the surface of the support and/or the cleaning layer thereby reducing electric resistance due to the increased hygroscopicity can be used.

BRIEF DESCRIPTION OF DRAWING

The drawing is a cross sectional view showing one embodiment of a magnetic recording medium of this invention wherein:
numeral 1 represents a support, numeral 2 represents a magnetic recording layer, numeral 3 represents a magnetic recording tape, numeral 4 represents a cleaning layer, numeral 5 represents an antistatic layer and numeral 6 represents a cleaning tape.

DESCRIPTION OF PREFERRED EMBODIMENTS

In this invention, one or more conventionally used antistatic agents (e.g., of the cationic, anionic and nonionic type) can be used.

As exemplary cationic type antistatic agents, there are quaternary ammonium salts, alkyl pyridinium salts, quaternized compounds of acrylic acid—alkylaminoacrylic esters, and higher amine halogenic acid salts.

As exemplary anionic type antistatic agents, there are alkyl phosphoric esters, alkyl sulfates, alkyl sulfonates and alkyl aryl sulfonates.

As exemplary nonionic type antistatic agents, there are polyoxyethylene alkyl ethers, polyoxyethylene alkylphenols, polyoxyethylene alkyl esters, polyoxyethylene alkylamines and polyoxyethylene alkylamides.

In providing an antistatic layer on at least one surface of the leader tape, the antistatic agent can be used alone or in combination with other materials, for example, a high molecular weight substance used as a binder for the cleaning layer. When the antistatic agent is used in combination with other materials, such combination should contain at least 30 wt% of the antistatic agent. The antistatic agent is generally coated, with or without a binder, after it is dissolved or swollen in a solvent. Particularly preferred solvents are water and $C_1 \sim C_4$ alcohols, e.g., methanol.

In this invention, if the amount of antistatic agent coated on the leader tape is less than about 5 mg/m$^2$, a sufficient antistatic effect cannot be obtained. If it is coated in an amount of more than about 300 mg/m$^2$, the leader tape does not always adhere to an adhesive tape when the magnetic recording tape is joined to the leader tape via the adhesive tape or if the leader tape can be adhered to the adhesive tape, the leader tape easily separates from the adhesives tape when the magnetic recording tape is repeatedly run in a tape recorder. Accordingly, a preferred amount to be coated is between about 5 mg/m$^2$ and about 300 mg/m$^2$ and a more preferred amount is between 30 mg/m$^2$ and 150 mg/m$^2$.

As the organic high molecular weight powder used to form the cleaning layer (which provides a coarse surface having a surface coarseness in the range of from about 0.5 to about 8 μm), there can be exemplified polyethylenes, polypropylenes, polycarbonates, epoxy resins, phenol resins, phenoxy resins, urea resins, benzoquanamine-formaldehyde resins, celluloses, polystyrenes, polyamides, polyesters and melamine resins. These powders generally have a molecular weight in the range of from about 5,000 to about 70,000 and a particle size in the range of from about 0.1 to about 20 μm.

As the binder for the organic high molecular weight powder, a high molecular weight substance such as vinyl chloride—vinyl acetate copolymers containing about 80 to about 95 wt% of vinyl chloride and 5 to 20 wt% of vinyl acetate, vinyl chloride—vinyl acetate—vinyl alcohol terpolymers containing about 85 to about 92 wt% of vinyl chloride, about 0.5 to about 9 wt% of vinyl acetate and about 1.5 to about 6 wt% of vinyl alcohol, vinyl chloride—vinylidene chloride copolymers containing about 80 to about 90 wt% of vinyl chloride and about 10 to about 20 wt% of vinylidene chloride, polyurethanes, nitrocelluloses, cellulose propionate, styrene—butadiene copolymers and polyester resins can be used, alone or in combination. These binders generally have a molecular weight in the range of from about 1,000 to about 60,000. Isocyanate can be contained in the binder, if desired or necessary, as a hardening agent to improve anti-abrasive property of the cleaning layer.

The ratio of the organic high molecular weight powder to the binder can be in the range of from about 1/6 to about 3/1 by weight.

The thus obtained cleaning tape has a light transmission of 40% or more and can be utilized to photoelectrically detect both ends of the magnetic recording tape.

The magnetic recording layer and support of the magnetic recording medium of this invention are conventional and can be prepared in accordance with the process as disclosed in U.S. Pat. No. 4,135,016. The support can be a non-magnetic flexible film.

This invention is now further explained with an accompanying drawing. A magnetic recording medium of this invention is composed of a magnetic recording tape 3 consisting of a support 1a and a magnetic recording layer 2 provided thereon, and a cleaning tape 6 which consists of a support 1b, a cleaning layer 4 and an antistatic layer 5 provided thereon, the end of the magnetic recording tape being connected to the cleaning tape by adhesive tape 7. The antistatic layer can also be provided on the surface of support 1b (opposite the cleaning layer) or the antistatic layer can be incorporated in the cleaning layer, if desired or necessary, which latter embodiment is also included in the scope of this invention.

Antistatic agent coated on a coarse surface stays in concave parts of the surface and thus running properties are not degraded even after the tape runs repeatedly. Further, even after antistatic agent coated on a coarse surface is rubbed off the antistatic effect hardly decreases because a part of the antistatic agent is transferred to the binder.

In the present invention, the organic low molecular weight compounds used as antistatic agents and the organic high molecular weight powder substantially do not adversely affect the light transmittance of the resulting leader tape and therefore they are preferably used. Some inorganic substances such as carbon also have antistatic effect, but they generally tend to lower the percent transmittance and are not preferred in the present invention.

This invention will now be further explained in detail with reference to the following examples. The compositions, ratios, operations and steps used to prepare various samples can be changed within the scope of this invention and this invention should not be limited thereto.

EXAMPLE 1

A cleaning tape having a coarse surface (coarseness: 3.0 $\mu$m) was prepared by coating on a 25$\mu$ thick polyethylene terephthalate support (65% transmittance) a mixture of 100 parts by weight of polyethylene powder (an organic high molecular weight compound having a molecular weight of about 50,000 and an average particle size of 2.5 $\mu$m), 100 parts by weight of a copolymer of vinyl chloride—vinyl acetate (86 wt% vinyl chloride and 14 wt% vinyl acetate, molecular weight: 25,000) as a binder and 100 parts by weight of epoxy resin (molecular weight: 1,400), in a 2,700 parts by weight of a mixed solvent of methyl ethyl ketone and toluene (7:3 by volume). A methanol solution or an aqueous solution of the following antistatic agents (3 parts by weight of antistatic agent and 1,000 parts by weight of methanol or water) was coated on the coarse surface or the base surface (back side) of the cleaning tape.

The charging properties of the resulting leader tape were determined by rubbing a leader tape with dry cotton cloth and putting the tape over cigarette ashes to measure the amount of static charge in terms of a minimum distance (cm) between the leader tape and cigarette ashes at which the ashes were not electrostatically attracted to the leader tape. In this test, cigarette ashes were used as a typical example of dust since they can be always obtained in a substantially uniform size. The longer the distance, the higher the electrostatic charge. The results obtained are shown in Table 1 below.

TABLE 1

| Sample No. | Antistatic agent | Surface coated with antistatic agent | Amount coated of antistatic agent | Charging properties |
|---|---|---|---|---|
| 1 | — | — | no antistatic treatment | 8.5 cm |
| 2 | Fatty acid amine quaternary ammonium salt (EFFCOL-72) | coarse surface | 50 mg/m$^2$ | 0.5 cm |
| 3 | Fatty acid amine quaternary ammonium salt (EFFCOL-72) | base surface | " | 1.0 cm |
| 4 | Alkylphosphate (PMX-3001) | coarse surface | " | 0.5 cm |
| 5 | " | base surface | " | 1.0 cm |
| 6 | Polyoxyethylene alkylamine (TENLO A-40) | coarse surface | " | 1.0 cm |
| 7 | Polyoxyethylene alkylamine (TENLO A-40) | base surface | " | 1.5 cm |

It will be understood from the above table that samples having coated an antistatic agent have more excellent antistatic effect than sample No. 1 having coated no antistatic agent.

EXAMPLE 2

In the same manner as in Example 1, a cleaning tape was prepared. An antistatic agent available under the trade name of EFFCOL-72 manufactured by Matsumoto Yushi Seiyaku Co., Ltd. (quaternary ammonium salt of fatty acid amine) was coated on the coarse surface or the base surface (back side) of the tape. The coarseness of the base surface was not an important factor.

The charging properties and adhesive condition of an adhesive tape (Scotch 41 Splicing Tape available from 3M) attached thereto were evaluated in accordance with changes in the amount of antistatic agent coated. In these tests, the endurance of the adhesive force was measured by applying a tension of 700 g momentarily and by applying a tension of 300 g for 30 minutes. The results obtained are set forth in Table 2 below.

TABLE 2

| Sample No. | Surface coated with antistatic agent | Amount coated of antistatic agent | Charging properties | Adhesive condition of adhesive tape |
| --- | --- | --- | --- | --- |
| 8 | coarse surface | 1 mg/m² | 3.5 cm | A |
| 9 | " | 5 mg/m² | 1.0 cm | A |
| 10 | " | 30 mg/m² | 0.5 cm | A |
| 11 | " | 50 mg/m² | 0.5 cm | A |
| 12 | " | 100 mg/m² | 0 cm | A |
| 13 | " | 150 mg/m² | 0 cm | B |
| 14 | " | 300 mg/m² | 0 cm | C |
| 15 | " | 400 mg/m² | 0 cm | D |
| 16 | base surface | 1 mg/m² | 5.0 cm | A |
| 17 | " | 5 mg/m² | 2.0 cm | A |
| 18 | " | 30 mg/m² | 1.0 cm | A |
| 19 | " | 50 mg/m² | 1.0 cm | A |
| 20 | " | 100 mg/m² | 0.5 cm | B |
| 21 | " | 150 mg/m² | 0.5 cm | C |
| 22 | " | 300 mg/m² | 0 cm | D |
| 23 | " | 400 mg/m² | 0 cm | D |

In the above Table 2, A indicates the adhesive tape does not slip off when a tension of 700 g is momentarily applied and does not slip off until a tension of 300 g is applied for 30 minutes.

B indicates the adhesive tape does not slip off when a tension of 700 g is momentarily applied but it slips up to 25μ when a tension of 300 g is applied for 30 minutes.

C indicates the adhesive tape does not slip off when a tension of 500 g is momentarily applied but it slips up to 30μ when a tension of 300 g is applied for 30 minutes.

D indicates the adhesive tape slips off with less than 500 g momentary tension, and slips at a distance more than 30μ with a tension of 300 g for 30 minutes.

EXAMPLE 3

An antistatic agent available under the trade name of "CHEMISTAT 6200" manufactured by Sanyo Chemical Industry Co., Ltd. (cationic antistatic agent) was coated on the coarse surface or the base surface of a cleaning tape prepared in the same manner as in Example 1, and was left for 48 hours at room temperature.

Then, the antistatic agent coated on the coarse surface or base surface was rubbed off using gauze impregnated with methanol. The charging properties before and after rubbing were evaluated as in Example 1. Results are given in Table 3 below.

TABLE 3

| Sample No. | Surface coated with antistatic agent | Before rubbing off antistatic agent | After rubbing off antistatic agent |
| --- | --- | --- | --- |
| 24 | coarse surface | 0.5 cm | 1.0 cm |
| 25 | base surface | 1.0 cm | 7.5 cm |

As there is only a negligible change in antistatic effect between before rubbing off and after rubbing off regarding Sample No. 24, it is clear that a part of the antistatic agent transferred to the binder.

EXAMPLE 4

Sample Nos. 11, 13, 14, 15, 19, 21, 22 and 23 prepared in Example 2 were connected to both ends of magnetic recording tapes having a length of 90 cm using an adhesive tape (Scotch 41 Splicing Tape available from 3M), slit to a width of 3.8 mm by a slitter and wound in a cassette half.

These tapes were put in a cassette tape recorder and fast forwarding and rewinding conducted the full length of the tapes 10 times, respectively. Each tapes was then checked as to whether the magnetic recording tape slipped from the leader tape having coated the antistatic agent at the area where they were joined. This test was performed in order to evaluate the adhesive force between the leader tape coated with an antistatic agent and the magnetic tape in terms of the slipping or peeling off (unjoined) at the area where they were joined after repeated fast forwarding and rewinding. The tape showing no slipping is preferred, but slipping within about 3 mm is practically acceptable. The results obtained are shown in Table 4 below.

TABLE 4

| Sample No. | Slipping condition at the joined area |
| --- | --- |
| 11 | no slip |
| 13 | no slip |
| 14 | slipped 3 mm |
| 15 | unjoined after fast forward and rewind 4 times |
| 19 | no slip |
| 21 | slipped 1 mm |
| 22 | unjoined after fast forward and rewind 4 times |
| 23 | unjoined after fast forward and rewind 3 times |

When the antistatic agent is coated in an amount 300 mg/m² or more, the slipping condition of the adhesive tape becomes worse, and the leader tape unjoins from the area of adhesion at fast forwarding, rewinding and stopping.

As mentioned above, a leader tape having coated thereon mixture of an organic high molecular weight compound and a binder to form a coarse surface has a high charging property upon rubbing.

Therefore, it is remarkably effective that a small amount of antistatic agent coated on the coarse surface or the base surface provides the effects of this invention. Particularly, when the antistatic agent is coated on the coarse surface, a portion of the antistatic agent transfers to the binder and the antistatic effects are retained longer.

From practical point of view, sufficient effects are obtained by adjusting the amount of antistatic agent coated to between 5 mg/m² to 300 mg/m².

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a support having coated thereon a magnetic layer and a leader tape connected to at least one end of the support and the magnetic layer, said leader tape having a light transmittance of 40% or more and comprising a support having coated thereon a cleaning layer containing an organic high molecular weight powder and a binder, wherein an antistatic layer comprising a cationic, anionic or non-ionic-type antistatic agent is provided on at least one surface of the leader tape and wherein the amount of said antistatic agent in said antistatic layer is in the range of from about 5 mg/m² to about 300 mg/m².

2. A magnetic recording medium according to claim 1, wherein said organic high molecular weight powder is selected from the group consisting of powders of polyethylenes, polypropylenes, polycarbonates, epoxy resins, phenol resins, phenoxy resins, urea resins, benzoguanamine-formaldehyde resins, celluloses, polystyrenes, polyamides, polyesters and melamine resins.

3. A magnetic recording medium according to claim 2, wherein said organic high molecular weight powder has a molecular weight in the range of from about 5,000 to about 70,000 and a particle size in the range of from about 0.1 to about 20 μm.

4. A magnetic recording medium according to claim 2, wherein said organic high molecular weight powder is a polyethylene powder.

5. A magnetic recording medium according to claim 1, wherein said binder is a high molecular weight substance having a molecular weight in the range of from about 1,000 to about 60,000.

6. A magnetic recording medium according to claim 1, wherein said binder is selected from the group consisting of vinyl chloride—vinyl acetate copolymers, vinyl chloride—vinyl acetate—vinyl alcohol terpolymers, vinyl chloride—vinylidene chloride copolymers, polyurethanes, nitrocelluloses, cellulose propionate, styrene—butadiene copolymers and polyester resins.

7. A magnetic recording medium according to claim 1, wherein the ratio of said organic high molecular weight powder to said binder is in the range of from about 1/6 to about 3/1 by weight.

8. A magnetic recording medium according to claim 1, wherein said cleaning layer has a coarse surface.

* * * * *